US011223487B2

(12) United States Patent
Weng et al.

(10) Patent No.: US 11,223,487 B2
(45) Date of Patent: Jan. 11, 2022

(54) METHOD AND SYSTEM FOR SECURE BLOCKCHAIN-BASED VEHICULAR DIGITAL FORENSICS

(71) Applicant: Jinan University, Guangdong (CN)

(72) Inventors: Jian Weng, Guangdong (CN); Ming Li, Guangdong (CN); Jiasi Weng, Guangdong (CN); Yue Zhang, Guangdong (CN); Anjia Yang, Guangdong (CN); Weiqi Luo, Guangdong (CN)

(73) Assignee: Jinan University, Guangzhou (CN)

( * ) Notice: Subject to any disclaimer, the term of this patent is extended or adjusted under 35 U.S.C. 154(b) by 142 days.

(21) Appl. No.: 16/824,093

(22) Filed: Mar. 19, 2020

(65) Prior Publication Data
US 2021/0297268 A1    Sep. 23, 2021

(51) Int. Cl.
*H04L 9/32* (2006.01)
*H04L 9/08* (2006.01)

(52) U.S. Cl.
CPC .......... *H04L 9/3268* (2013.01); *H04L 9/0838* (2013.01)

(58) Field of Classification Search
CPC ............................ H04L 9/3268; H04L 9/0838
See application file for complete search history.

(56) References Cited

U.S. PATENT DOCUMENTS 5,991,414 A    11/1999  Garay et al.
10,699,574 B1 *  6/2020  Zeryihun ............... H04L 9/3268

| | | | |
|---|---|---|---|
| 2018/0343110 A1* | 11/2018 | Funk | H04L 9/0838 |
| 2020/0279257 A1* | 9/2020 | Cheng | G06Q 20/405 |
| 2020/0304318 A1* | 9/2020 | Kravitz | H04W 12/06 |
| 2020/0404023 A1* | 12/2020 | Zhu | H04L 63/0807 |

(Continued)

FOREIGN PATENT DOCUMENTS

CN        111327597 A    *  6/2020

OTHER PUBLICATIONS

Fan Zhang,Ethan Cecchetti,Kyle Croman,Ari Juels,Elaine Shi; Town Crier:An Authenticated Data Feed for Smart Contracts; Proceedings of the 2016 ACM SIGSAC Conference on Computer and Communications Security,Oct. 2016, pp. 270-282.

(Continued)

*Primary Examiner* — Samson B Lemma
*Assistant Examiner* — Zoha Piyadehghibi Tafaghodi

(57) ABSTRACT

A method of digital forensics based on blockchain technology and a fine-grained access control scheme, using a finite state machine (FSM) based on smart contracts to manage a digital certificate, where a law enforcement agency ends the warrant request to a court and upon approval of the request collects the forensics data by obtaining the master secret key for accessing the forensic data from a plurality of authorities. The forensics data are encrypted by D-KP-ABE (Distributed Key Police Attribute-based Encryption) with privacy-preserved access policy. The secret sharings are required to form the decryption key for accessing the forensics data. The secret sharings are distributed among the plurality of authorized authorities so that no individual authority has a complete master key by itself. Each state of the FSM requires digital signature(s) of at least one specific authorized authority for transitioning to a next state.

5 Claims, 4 Drawing Sheets

(56) References Cited

U.S. PATENT DOCUMENTS

2021/0092604 A1* 3/2021 Fox .................. H04K 3/45

OTHER PUBLICATIONS

Yuan Lu, Qiang Tang, Guiling Wang; ZebraLancer: Private and Anonymous Crowdsourcing System atop Open Blockchain; 2018 IEEE 38th International Conference on Distributed Computing Systems (ICDCS), 2018, 853-865.
Satoshi Nakamoto; Bitcoin: Peer-to-Peer Electronic Cash System; Oct. 31, 2008.
Yannis Rouselakis,Brent Waters; Practical Constructions and New Proof Methods for Large Universe Attribute-Based Encryption; Proceedings of the 2013 ACM SIGSAC conference on Computer & communications security,Nov. 2013,pp. 463-474.
Russell O'Connor; Simplicity: A New Language for Blockchains; PLAS'17, Oct. 30, 2017, Dallas, TX, USA.
Dongxiao Liu,Amal Alahmadi,Jianbing Ni,Xiaodong Lin,Xuemin Shen; Anonymous Reputation System for IIoT-Enabled Retail Marketing Atop PoS Blockchain; IEEE Transactions on Industrial Informatics, vol. 15. No. 6. Jun. 2019,pp. 3527-3537.
Susan Hohenberger,Brent Waters; Attribute-Based Encryption with Fast Decryption; May 8, 2013.
Mumin Cebe, Enes Erdin, Kemal Akkaya, Hidayet Aksu,Selcuk Uluagac; Block4Forensic: An integrated Lightweight Blockchain Framework for Forensics Applications of Connected Vehicles; IEEE Communications Magazine,vol. 56, Issue: 10, Oct. 2018,pp. 50-57.
Umit Karabiyik; Building an Intelligent Assistant for Digital Forensics; Florida State University Libraries,2015.
Melissa Chase; Multi-authority Attribute Based Encryption; TCC 2007, LNCS 4392, pp. 515-534.
Ming Li, Jian Weng, Anjia Yang, Wei Lu,Yue Zhang, Lin Hou, Jianan Liu; CrowdBC: A Blockchain-based Decentralized Framework for Crowdsourcing; IEEE Transactions on Parallel and Distributed Systems ( vol. 30, Issue: 6, Jun. 1, 2019),pp. 1251-1266.
Joshua A. Kroll,Edward W. Felten,Dan Boneh; Secure protocols for accountable warrant execution.
Dr. Gavin Wood; Ethereum: A Secure Decentralised Generalised Transaction Ledger Final Draft—Under Review.
Rosario Gennaro, Stanis law Jarecki, Hugo Krawczyk, and Tal Rabin; Secure Distributed Key Generation for Discrete-Log Based Cryptosystems; EUROCRYPT'99, LNCS 1592, pp. 295-310, 1999.
Jeremy S. Daily, Nathan Singleton, Beth Downing, Gavin W. Manes; Light Vehicle Event Data Recorder Forensics; Computer and Information Sciences and Engineering.
Asaph Azaria, Ariel Ekblaw, Thiago Vieira and Andrew Lippman; MedRec: Using Blockchain for Medical Data Access and Permission Management; In Open and Big Data (OBD), International Conference on, pp. 25-30. IEEE, 2016.
Han, Jinguang; Susilo, W.; Mu, Yi; Yan, Jun; Privacy-Preserving Decentralized Key-Policy Attribute-Based Encryption; IEEE Transactions on Parallel and Distributed Systems, 2012, vol. 23, issue 11.
Charles Rackoff,Daniel R. Simon; Non-Interactive Zero-Knowledge Proof of Knowledge and Chosen Ciphertext Attack; Cryptology—CRYPT0 '91, LNCS 576, pp. 433-444, 1992.
Jung Hyun Ryu,Pradip Kumar Sharma,Jeong Hoon Jo,Jong Hyuk Park; A blockchain-based decentralized efcient investigation framework for IoT digital forensics; The Journal of Supercomputing vol. 75, pp. 4372-438(2019).
Shams Zawoad, Amit Kumar Dutta, and Ragib Hasan, Towards Building Forensics Enabled Cloud Through Secure Logging-as-a-Service; IEEE Transactions on Dependable and Secure Computing ( vol. 13, Issue: 2, 2016), pp. 148-162.
Nhien-An Le-Khac , Daniel Jacobs , John Nijhoff , Karsten Bertens , Kim-Kwang Raymond Choo; Smart vehicle forensics: Challenges and case study; Future Generation Computer Systems,vol. 109, Aug. 2020, pp. 500-510.
Juan A. Garay,Aggelos Kiayias, Nikos Leonardos; The Bitcoin Backbone Protocol:Analysis and Applications; Cryptology—EUROCRYPT 2015 pp. 281-310.
Jonathan Frankie,Sunoo Park,Daniel Shaar,Shafi Goldwasser,Daniel J. Weitzner; Practical Accountability of Secret Processes;27th USENIX Security Symposium,pp. 657-674.
Jesse Lacroix,Khalil El-Khatib,Rajen Akalu; Vehicular Digital Forensics: What Does My Vehicle Know About Me?; the 6th ACM Symposium,Nov. 2016 pp. 59-66.
Silvia Bonomi,Marco Casini,and Claudio Ciccotelli; B-CoC: A Blockchain-based Chain of Custody for Evidences Management in Digital Forensics; 2018.
Umit Karabiyik and Kemal Akkaya; Digital Forensics for IoT and WSNs; Mission-Oriented Sensor Networks and Systems: Art and Science pp. 171-207.
Zhen Liu, Zhenfu Cao, and Duncan S. Wong; Efficient Generation of Linear Secret Sharing Scheme Matrices from Threshold Access Trees.
Shweta Agrawal,Dan Boneh,and Xavier Boyen; Lattice Basis Delegation in Fixed Dimension and Shorter-Ciphertext Hierarchical IBE; CRYPTO 2010, LNCS 6223, pp. 98-115, 2010.
Ming Li, Jian Weng,Jia-Nan Liu, Anjia Yang, Xiaodong Lin; Enabling Accountability and Privacy Preservation for Vehicular Digital Forensics over Blockchain; IEEE Transactions on Vehicular Technology,2015.
George I. Seffers; DHS Navigates the World of Vehicular Digital Forensics; SIGNAL Magazine,May 25, 2016.
Junzuo Lai,Robert H. Deng,Yingjiu Li,Jian Weng; Fully Secure Key-Policy Attribute-Based Encryption with Constant-Size Ciphertexts and Fast Decryption; Proceedings of the 9th ACM symposium on Information, computer and communications security,Jun. 2014,pp. 239-248.
Shorouq Alansari, Federica Paci, Vadimiro Sassone; A Distributed Access Control System for Cloud Federations; 2017 IEEE 37th International Conference on Distributed Computing Systems (ICDCS).
Hafizah Mansor, Konstantinos Markantorakis,Raja Naeem Akram,Keith Mayes,and Iakovos Gurulian; Log your car: The non-invasive vehicle forensics; 2016 IEEE Trustcom/BigDataSE/ISPA.
Shafi Goldwasser,Sunoo Park; Public Accountability vs. Secret Laws: Can They Coexist?; WPES'17, Oct. 30, 2017.
Sana Belguith, Nesrine Kaaniche, Maryline Laurent, Abderrazak Jemai,Rabah Attia; PHOABE: securely outsourcing multi-authority attribute based encryption with policy hidden for cloud assisted IOT; Computer Networks,vol. 133, Mar. 14, 2018, pp. 141-156.
Bo Wu,Qi Li, Ke Xu,Ruoyu Li,Zhuotao Liu; SmartRetro: Blockchain-based Incentives for Distributed IoT Retrospective Detection; 2018 IEEE 15th International Conference on Mobile Ad Hoc and Sensor Systems (MASS).
Jeremy Horwitz and Ben Lynn; Toward Hierarchical Identity-Based Encryption; EUROCRYPT 2002, LNCS 2332, pp. 466-481, 2002.

* cited by examiner

```
                    BB-VDF Contract
On receive ("Request", des, H_req) from C.
    create st;
    set st := WARRANT REQUEST;
    put warrantPool[H_req] = (des, msg.sender, block.time);
    ▷ initialize the collected key shares number;
    initialize warrantPool[H_req].sharesNum = 0;
    broadcast ("An investigation request has been created.");
    ▷ e.g., by Event mechanism on Ethereum
On receive ("Permit", H_req, H_1(ρ(1))^r_1, ..., H_1(ρ(ℓ))^r_ℓ) from C.
    ▷ audit the warrant request off-chain.
    assert st = WARRANT REQUEST;
    parse req and check the validity as in Equation (12);
    put warrantPool[H_req].keyPara = (H_1(ρ(1))^r_1, ..., H_1(ρ(ℓ))^r_ℓ);
    set st := WARRANT AUTHORIZATION;
    broadcast ("An investigation has been permitted by the court.");
On receive ("Reject", H_req) from C.
    ▷ clean intermediate variables.
    delete warrantPool[H_req];
    set st := COMPLETE;
    broadcast ("An investigation has been rejected by the court.");
On receive ("Store", H_req, H_0(φ_1), ..., H_0(φ_ℓ)) from C.
    assert st = WARRANT AUTHORIZATION;
    put warrantPool[H_req].keyBlindPara = (H_0(φ_1), ..., H_0(φ_ℓ));
    broadcast ("The law enforcement submits the blinded values.");
On receive ("Retrieve", H_req, g^{r_{1,j}} H_1(ρ(1))^{r_1 c_j},
            ..., g^{r_{ℓ,j}} H_1(ρ(ℓ))^{r_ℓ c_j}) from A_j.
    assert st = WARRANT AUTHORIZATION;
    put warrantPool[H_req].sharesPara = (π_j, g^{r_{1,j}} H_1(ρ(1))^{r_1 c_j},
            ..., g^{r_{ℓ,j}} H_1(ρ(ℓ))^{r_ℓ c_j});
    warrantPool[H_req].sharesNum += 1;
    ▷ check whether t + 1 shares have been collected;
    if warrantPool[H_req].sharesNum ≥ t + 1
        set st := DATA COLLECTION;
        broadcast ("The investigator collects enough shares.");
    else broadcast ("The A_j submits the decryption key shares.");
On receive ("Collect", H_req, H_0(H_M_id,type,r_i)) from C.
    assert warrantPool[H_req].sharesNum ≥ t + 1;
    put warrantPool[H_req].dataDigest=H_0(H_M_id,type,r_i);
    set st = DATA COLLECTION;
    broadcast ("The investigator has collected the forensics data.");
    ▷ NOTE: The process of data examination and analysis are skipped.
On receive ("Report", H_req, H_0(report)) from C.
    assert st = DATA ANALYSIS;
    put warrantPool[H_req].report=H_0(report);
    set st := FORENSICS REPORT;
    broadcast ("The investigator starts to examine the forensics data.");
On receive ("Complete", H_req, multiSignature) from C and C.
    verify multiSignature;
    assert st = FORENSICS REPORT;
    set st := COMPLETED;
    broadcast ("The investigation has been accomplished.");
```

FIG. 5

METHOD AND SYSTEM FOR SECURE BLOCKCHAIN-BASED VEHICULAR DIGITAL FORENSICS

TECHNICAL FIELD

The present disclosure relates to the field of vehicular digital forensics, particularly to a method and system for designing a secure blockchain-based vehicular digital forensics.

BACKGROUND

The functionalities of vehicles have been strengthened tremendously with the increasing in-vehicle sensors, control units, and communication methods, such as Electronic Control Unit (ECU), Bluetooth, and Wi-Fi. According to statistics from FORD Motor Company, a modern-day vehicle has approximately 50-70 computers, which enables it to be an important source of digital data. This large amount of sensing and operation data makes vehicles more intelligent and smarter, which will prompt the prosperity of autonomous driving industry effectively in the near future.

However, as everything has its two sides, the increasing smart vehicles also bring lots of security issues. Using vehicles as weapons to conduct terrorist attacks are not rare and have caused tremendous damages and losses to our society. Specially, vehicle ramming attack (VRA) is one of the typical attacks in reality. It refers that malicious attackers deliberately use a vehicle to ram into a building or a crowd of people. For example, in Jul. 14, 2016, a 20-ton rental truck was rammed into the crowd watching a firework display in Nice, France, which resulted in the deaths of 86 people and wounded more than 450. Since it is incredibly easy to get a vehicle from rental companies, many terrorist attackers choose a rental car as the criminal weapon. In other words, launching a VRA requires minimal capability while can cause catastrophic disasters to the society. It has been spread like a virus in recent years. According to a news channel report on terrorist attacks caused by vehicle, at least 7 major attacks happened in 2017, which led to the death of at least 37 people and hundreds of pedestrians got injured.

For these types of VRAs, a forensics investigation specialized for vehicle can be conducted to analyze the suspicious behaviors and collect evidences, which has been called Vehicular Digital Forensics (VDF) (also called "Vehicle Forensics"). VDF has gained considerable attention both in academic and industrial area since a vast amount of data being collected by in-vehicle computers. It can help law enforcement agencies to detect a potential VRA by identifying suspicious activities. In particular, this field becomes more significant with the forthcoming era of car-sharing and self-driven cars, which are the way of the future. However, it also brings a burning question: who is at fault if a self-driven car gets involved in a fatal accident, the driver or the car manufacturer who develops the self-driving algorithms? If it is in the latter case, the manufacturer could be sued for an unprecedented amount of money for a lost life, and eventually may go out of business. Thus, it has become crucial to have a forensically sound way for authorities to investigate car accidents in the era of autonomous driving.

As for VRA, the law enforcement agency may prevent it from happening beforehand if it obtains valuable data by VDF. For instance, the rental company can detect that someone has difficulty in explaining the purposes of renting a car. Combining with other related data, such as traffic management center reporting that the car is parked in a specific area for several days without any reasonable explanation, the law enforcement agency may confirm that it is a potential threat to the public safety in this area. It is obvious that a single data source is not enough for the analysis of suspicious behaviors, thus the comprehensive historical data from the car and other related data sources needs be obtained by the investigators. Unfortunately, it is not easy to conduct a vehicle forensics investigation due to the existence of several security issues.

Actually, there are several security and privacy issues in the above example that may have adverse impact on the implementation of VDF: 1) first, the detailed contents of the warrant may be leaked to Carl by malicious external attackers, which makes Carl alert and he may change his behavior temporarily; 2) second, Bob may abuse his power to get more data that is unrelated to the car from the parties, or even tamper the collected evidences; 3) third, there may exist malicious insiders in the related parties who modify the historical data before presenting to Bob, or claim the historical data has been lost, which apparently violates the digital chain of custody. Apart from these, there exist other problems which are adverse to the normative VDF procedures. Specifically, as vehicles are becoming smarter and more complicated, it is hard for the law enforcement agency to get forensics data due to the lack of specialized tools, but to appeal for technical help from a commercial party. However, it may bring the potential threat to privacy and some private data may get leaked. Besides, since the court releases large number of warrants accumulatively, the court may forget to trace the state of the warrant, which allows semi-honest investigators to still use these warrants to obtain secret data (even though they are expired). It is not an easy work for the court to trace the states of all released warrants in reality.

Although, some schemes have been proposed to solve parts of the issues, most of them are for different applications, and under different system models or security threats. Specifically, the public should be able to audit the process of VDF while preserving the privacy, which assures the accountability and legitimacy of the forensics process without abusing or misusing power. In addition, the forensics data should be securely obtained by the law enforcement agency with fine-grained access control, nothing more and nothing less. It is non-trivial to consider the above security issues and challenges in VDF scenario simultaneously. One of the papers in the state of the art proposes a framework on integrating different parties' data to conduct the vehicle forensics based on blockchain. However, they do not focus on resolving the challenges that the confidentiality of the warrants should be preserved during the forensics process (especially for the terrorist attacks), and the law enforcement agency or other parties may behave dishonestly.

To mitigate this issue, the present disclosure proposes a blockchain-based scheme for VDF named BB-VDF, in which the accountable protocols and privacy preservation methods are constructed.

SUMMARY

To address the issues described above, the present disclosure proposes a method and system for designing a secure blockchain-based vehicular digital forensics.

The following technical solutions are used in the implementations of the present disclosure:

A method of digital forensics based on a blockchain privacy protection and fine-grained access control, including following steps:

using a finite state machine (FSM) based on a smart contract to manage a digital certificate for a full cycle, wherein, the full cycle includes eight states including a warrant request state, a warrant authorization state, a shared key acquisition state, a data collection state, a data examination state, a data analysis state, a forensic report state and a completion state;

entering the warrant request state and initializing a request for a warrant by a law enforcement agency and sending the request to a court and entering the warrant authorization state without leaking any sensitive information;

after receiving the request for the warrant, the court inspects the request for the warrant in the smart contract;

if the court rejects the request for the warrant, entering the FSM into the completion state, otherwise sending a permit allowing the request for the warrant by the court to the law enforcement agency along with a digital signature of the court;

after receiving the permit from the court, the law enforcement agency enters the shared key acquisition state, and obtains a fragmentation key from an alliance agency to form a master key, wherein the fragmentation key is a partial part of the master key shared between a plurality of stakeholders of the digital forensics;

after receiving the secret share from the alliance agency, the law enforcement agency forms the master key to collect data for digital forensics, the status of state machine enters the data collection state;

after collecting the data, the law enforcement agency examines the data by using existing tools and the status of state machine enters the data examination state;

after examining the data, the law enforcement agency begins to analyse the data and the status of state machine enters the data analysis state;

after analyzing the data, the law enforcement agency forms a forensics report based on the examination and analysis of the data, and sends the report to the court. Meanwhile, the status of state machine enters the forensic report state; and after forming the forensics report, entering the completion state;

where, each state transfer in the state machine requires digital signature(s) of at least one specific member for transitioning to a next state.

Preferably, the method further includes:

in the certificate request state, creating a digital forensics transaction in the smart contract by the law enforcement agency, transmitting sensitive information of forensics attributes including forensics object, data type, and time to the court over a secure channel and obtaining a first evidence;

in the warrant authorization state, after receiving the forensics attributes, generating D-KP-BAE (Distributed Key Police Attribute-based Encryption) attribute encrypted intermediate parameters and signing the D-KP-BAE attribute encrypted intermediate parameters by the court, and publishing the D-KP-BAE attribute encrypted intermediate parameters in the blockchain; obtaining a second evidence;

in the shared key acquisition state, obtaining the fragmentation key from the alliance agency through authorized information, wherein, the alliance agency jointly manages the master key, and uses the fragmentation key to process and obtain the D-KP-BAE attribute encrypted intermediate parameters issued by the court; and in the data collection state, after receiving the fragmentation key from the stakeholders, the law enforcement agency combines the fragmentation key to generate a decryption key for a corresponding attribute, and collects the data in a storage system.

Preferably, the request for the warrant includes access policy information and metadata.

Preferably, the warrant has a unique identifier in the blockchain.

In another implementation, a digital forensics system based on blockchain technology and a fine-grained access control scheme, includes a business layer, an application layer, a blockchain layer, and a distributed data storage layer connected sequentially. The business layer is a web-oriented digital forensics management supporting login operations of users with different roles to provide respective user interaction functions. The application layer supports functional components including forensics, deposit, and traceability. The data interface layer is based on WEB3J and is configured to implement a conversion logic of a user input and smart contracts. The blockchain layer is a Consortium Blockchain built on a plurality of trusted institutions, and uses the smart contracts to complete a digital forensics state machine execution. The trusted institutions include a law enforcement agency, a court, a plurality of alliance key management authorities, an insurance company and data sources. The data distribution storage layer stores forensics data, wherein, the forensics data is encrypted by a master secret key required for accessing the forensics data and the master secret key is generated by distributed key generation (DKG) protocol. The master secret key is divided and shared between at least three key management authorities selected from the plurality of alliance key management authorities. The forensics data is continuously updated on the data distribution storage layer after predetermined intervals.

Preferably, the forensics data are encrypted by D-KP-ABE with access policy privacy preservation.

BRIEF DESCRIPTION OF THE DRAWINGS

The drawings described here are intended to provide a further understanding of the present disclosure, and constitute a part of the present disclosure. The illustrative implementations of the present disclosure and description of the implementations are intended to describe the present disclosure, and do not constitute limitations on the present disclosure.

FIG. 5 shows a BB-VDF contract for the state machine model according to the embodiment.

DETAILED DESCRIPTION OF THE EMBODIMENTS

The exemplary embodiments of the present disclosure are described below in detail with reference to the drawings. It should be understood that the exemplary embodiments described below are used only to illustrate and interpret the present disclosure and are not intended to limit the present disclosure.

It should be noted that the exemplary embodiments of the present disclosure and features in the exemplary embodiments may be combined with each other in the case of no conflict, and all the combinations fall within the protection scope of the present disclosure. In addition, although a logical order is shown in the flowchart, the steps shown or described may be performed in a different order from the order here in some cases.

In implementations, a computing device that performs a data processing method may include one or more processors (CPU, Central Processing Module), an input/output interface, a network interface and a memory.

The memory may include a volatile memory, a random access memory (RAM) and/or a non-volatile memory and other forms in a computer readable medium, for example, a read-only memory (ROM) or a flash RAM. The memory is an example of the computer readable medium. The memory may include a module 1, a module 2, . . . , and a module N (N is an integer greater than 2).

The computer readable medium includes non-volatile and volatile media as well as removable and non-removable storage media. A storage medium may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic disk storage or other magnetic storage devices, or any other non-transmission media, and may be used to store information accessible to the computing device.

Digital Forensics

Figure 1:
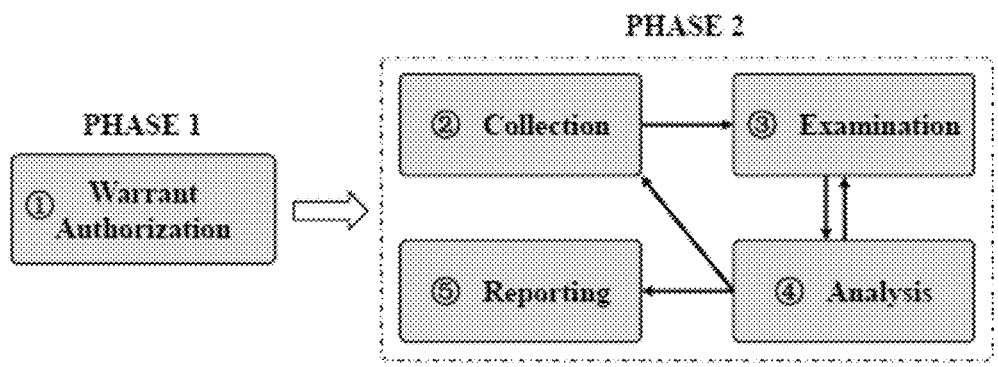
FIG. 1 shows a workflow of digital forensics.

Referring to FIG. 1, a digital forensics process can be depicted in two main phases: 1) the first phase is the warrant authorization that law enforcement agency (e.g., the policeman) requests a valid authorization from the court before accessing data of any individual entity. The warrant contains a signature from the court to permit the law enforcement agency to conduct the investigation. 2) The second phase is on data processing. It contains four steps: collection, examination, analysis, and reporting. Specifically, collection is the process of collecting evidences that aims to gather sufficient data from the software system (e.g., mobile App) or hardware devices (e.g., physical RAM and SD card). These data and devices should be stored with due care to protect the integrity and confidentiality. Examination is to perform search of the data that is related with the respondent or the suspected crime. Analysis aims to conduct more systematic and professional analysis on the collected data or devices. Reporting is responsible for providing the final investigation reports on the results of the previous process.

Blockchain and Smart Contract

Most recently, the blockchain technology has been employed in many applications, such as financial services, healthcare, internet-of-things (IoT) and crowdsourcing. It is essentially a distributed ledger that is maintained by a number of network nodes (also called blockchain nodes). Blockchain nodes may have mutual distrust while can still reach an agreement based on the consensus protocol, e.g., proof of work (PoW) or proof of stake (PoS). The blockchain is composed of a series of consecutive blocks, i.e., an ordered hash chain. Each block contains a number of transactions. Its security assurance is based on the cryptographic primitives that ensure the transmission of digital currency or status transitions among different entities in a secure way.

Particularly, the review of main features on blockchain can be listed as follows: 1) Complete Decentralization: it is based on distributed P2P network that many untrusted nodes can achieve fair data exchange without reliance on a central party. 2) Correct Execution: blockchain is a global computer that each blockchain node can trace and verify the correctness of the data computation. 3) Tamper-resistance: the data (i.e., blocks and transactions) are tamper-resistant since they are organized as the special data structure (Merkle tree and hash chain).

Also, smart contracts are used to construct the decentralized application (DApp), which facilitates the process of an application to be executed automatically on blockchain technology. People can participate in a DApp by providing valid inputs to execute a function in smart contract. Such function execution corresponds to a transaction on the chain.

Cryptography Algorithms

In the present disclosure, following cryptographic algorithms are used as building blocks to achieve the accountability and fine-grained access control.

Bilinear Pairing: Let $G_1$ and $G_2$ be two multiplicative cyclic groups of prime order p. g is a random generator of $G_1$. Let $e: G_1 \times G_2 \rightarrow G_T$ be a computable bilinear pairing with the following properties:

Bilinearity: for all $g \in G_1$ and $a, b \in Z_P$, we have $e(g^a, g^b) = e(g^b, g^a)$ Non-degeneracy: $e(g, g) \neq 1$ Distributed Key Generation (DKG)

DKG is one of the components in (t, n)-threshold cryptosystem. It allows several n parties to collectively generate a key pair (i.e., public key and private key) without letting any single party to reconstruct or store the secret key. Besides, it does not rely on any trusted party to achieve n-secure level, which means that the protocol is secure if no more than t+1 parties are broken. Further, the security of DKG protocol with the uniform randomness property is better. By running the proposed DKG protocol, each honest party will hold a share $\alpha_i$ of a secret key $\alpha$, i.e. each party holds the secret key partially. For any each set N of t+1 correct shares, $\alpha = \sum_{i \in \mathcal{N}} \lambda_i \cdot \alpha_i$, where $\lambda_i$ are Lagrange interpolation coefficients for set $\mathcal{N}$. Specially, the t-secure DKG protocol will always satisfy the following correctness and secrecy properties:

correctness: Any subsets pf t+1 shares define the same privacy key $\alpha$ ($\alpha \in \mathbb{Z}_p$) and all parties share the same public key $y = g^\alpha$.

Secrecy: There is no information learned on x expect for the implication of value $y = g^\alpha$.

Key Police Attribute-Based Encryption (KP-ABE)

Figure 2:
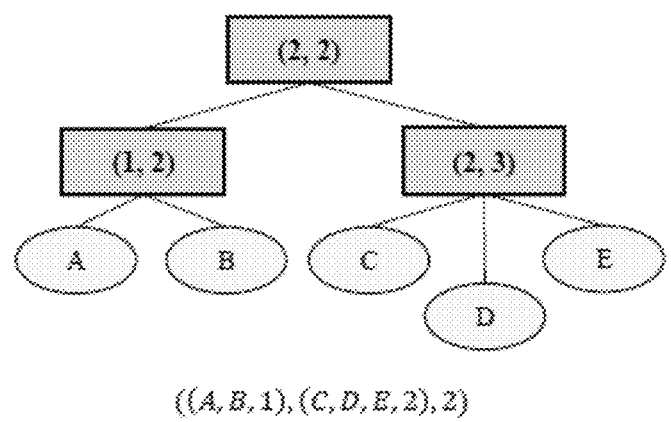
FIG. 2 shows an example of access policy in KP-ABE scheme.
Figure 3:
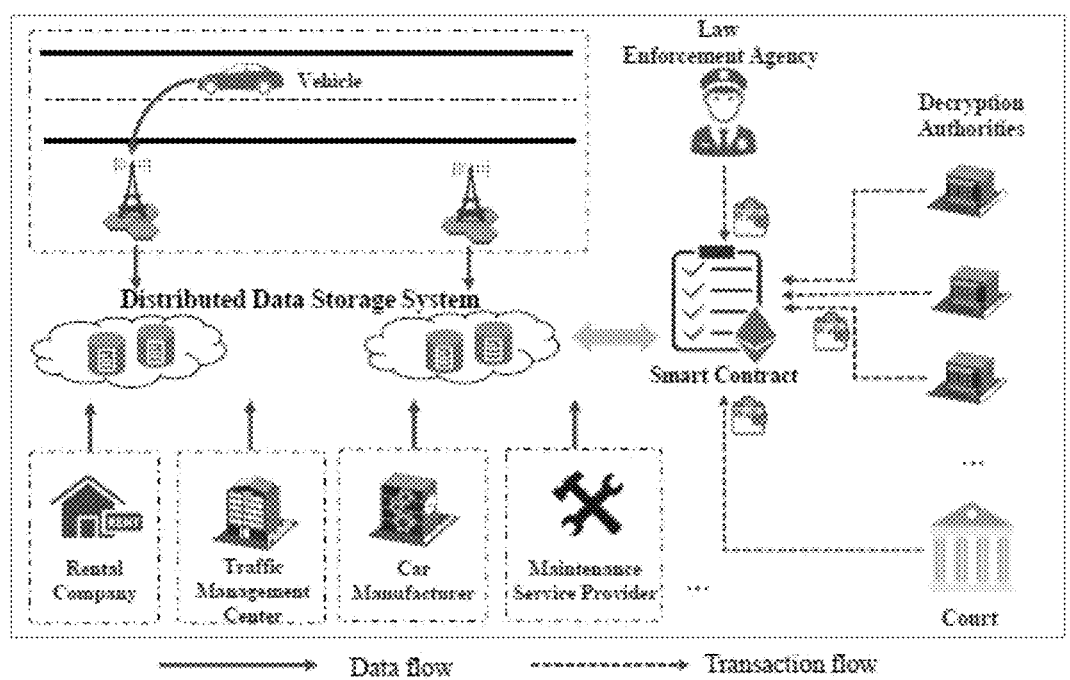
FIG. 3 shows a system model according an embodiment of the present disclosure.

KP-ABE scheme is a type of public key encryption. It allows user to encrypt and decrypt data based on attributions. Compared with the identity-based encryption (IBE) scheme, KP-ABE scheme is more suitable to support fine-grained access control policy. As shown in FIG. 2, the leaf nodes refer to attributes and non-leaf nodes refer to threshold gates. It denotes a comprehensible access structure, namely, ((A, B, 1), (C, D, E, 2), 2). Generally, KP-ABE consists of the following four algorithms:

Setup($1^\eta$)→(PK, MSK). The setup algorithm takes a security parameter $\eta$ as the input and outputs the public parameters PK and a master secret key MSK. It chooses a bilinear group $G_1$ of prime order p, and $\alpha \in \mathbb{Z}_p$, g is a random generator of $G_1$, x refers to the attributions. H(x) is a hash function: $H\{0,1\}^* \rightarrow G_1$. PK and MSK can be presented as follows:

$$PK = (G_p, g, e)^\alpha, H(x)), MSK = \{\alpha\}. \quad (1)$$

EnCrypt(PK, M,S)→CT. The encryption algorithm takes the public parameters PK, a set of attributes S and a message M as the inputs. It selects a random number $s \in \mathbb{Z}_p$ outputs a ciphertext CT={S, C, Ĉ, $\{C_x\}_{x \in S}$} as follows:

$$C = M \cdot e(g,g)^{\alpha s}, \hat{C} = g^s, \{C_x = h_x^s\}_{x \in S}. \quad (2)$$

KeyGen(PK,MSK, A)→SK. The key generation algorithm takes the public parameters PK, the master secret key MSK and an access structure $\mathbb{A}$ as the inputs and outputs the private key SK, $\mathbb{A} = (W, \rho)$ is an LSSS access structure. W is an l×n matrix, $\mathbb{A}$ 9 ρ is the function that maps the rows of W to attributes. Γ is the set of distinct attributes that appear in W, $\gamma = \{d : \exists i. \in [1,l], \rho(i) = d\}$. The algorithm selects a random vector $\vec{v} = (\alpha, y_2, \ldots, y_n)$. For i=1 to l, it calculates $\mu_i = \vec{v} \cdot W_i$. Then, it chooses random $r_1, \ldots, r_l \in \mathbb{Z}_p$ and computes SK as follows:

$$PK_s(D_1 = g^{\alpha 1} \cdot h_{\rho(1)}^{r1}, R_1 = g^{r1}, \forall d \in \Gamma/\rho(1), Q_{1,d} = h_d^{r1}), \ldots, (D_l = g^{\mu 1} \cdot h_{\rho(l)}^{r1}, R_e = g^{r1}, \forall d \in \Gamma/\rho(l), Q_{l,d} = h_d^{r1}), \quad (3)$$

Decrypt (PK, SK, CT)→M. The decryption algorithm takes as input the public parameters PK, a private key SK, and a ciphertext CT associated with a set of attributes S. If the set S of attributes satisfies the access structure $\mathbb{A}$, then the algorithm will decrypt the ciphertexts and return a message M. Let $I \subseteq \{1, \ldots, l\}$ be a set of indices, $\Delta = \{x : \exists i \in I, \rho(i) = x\}$, and $\{w_i\}_{i \in I} \in \mathbb{Z}_p$. The algorithm decrypts the cyphertext as follows:

$$L = \prod_{x \in \Delta} C_x = \prod_{x \in \Delta} h_x^s. \quad (4)$$

$$e(g,g)^{\alpha e} = e\left(\hat{C}, \prod_{i \in I} \hat{D}_i^{\omega_i}\right) / e\left(\prod_{i \in I} \hat{R}_i^{\omega_i}, L\right)$$

System and Threat Models and Security Goals

The blockchain-based VDF framework and system model according to one embodiment of the instant disclosure will be explained below.

System Model

As illustrated in FIG. 1, there exist six parties involved in our proposed scheme: Data Sources, Law Enforcement Agency, Court, Decryption Authorities, Blockchain Platform, Distributed Data Storage. Each party has a corresponding key pair (i.e., public key and private key). The notations that will be utilized in the detailed description of the present disclosure are presented in Table 1.

TABLE 1

The notations used in the present disclosure

| Notation | Explanation |
| --- | --- |
| $\mathcal{L}$ | The law enforcement agency. |
| $\mathcal{C}$ | The court. |
| $\mathcal{B}$ | The blockchain platform. |
| $\mathcal{D}$ | The distributed data storage system. |
| $(\mathcal{A}_1, \ldots, \mathcal{A}_n)$ | The n decryption authorities. |
| $(S_1, \ldots, S_m)$ | The data sources. |
| PK, MSK | The public parameters and master secret key. |
| id, type, t | The identifier, type, and timestamp of forensics data. |
| $K_e^p, K_e^s$ | The entity's public key and private key. |
| $M_1 \| M_2$ | The concatenation of messsage $M_1$ and $M_2$. |

TABLE 1-continued

The notations used in the present disclosure

| Notation | Explanation |
| --- | --- |
| $H_0, H_1, H_2$ | Three non-cryptographic hash functions. |
| $Enc_{ak}(M)$ | The symmetric encryption on message M with private, symmetric key sk, e.g., AES. |
| r', $r_x$, $r_{x,y}$ | The generated random numbers. |
| $\mathbb{A} = (W, \rho)$ | The access structure in KP-ABE. |
| Ti | The timestamp in the transaction. |

Data Sources: identified by $s = \{s_1, \ldots, s_i, \ldots, s_m\}$, refer to the different entities who can provide the forensics data, including the automotive vehicles equipped with digital devices (e.g., electronic control units (ECUs) and GPS systems), rental companies, traffic management center, car manufacturers, and car maintenance centers. S will generate the necessary data which are helpful for VDF and store them to the distributed data storage based on forensics-by-design paradigm. We assume that each vehicle has the On Board Units (OBUs) that can be used to communicate with the roadside units or other vehicles with the Dedicated Short Range Communications (DSRC) protocol. The data sources can submit the forensics data according to the similar algorithms in the present design.

Law Enforcement Agency: identified by $\mathcal{L}$, refers to the investigator (e.g., the policeman) who is responsible for launching a digital forensics investigation. $\mathcal{L}$ is assumed to have some professional skills (including software and hardware skills) to acquire data from S and the data storage system.

Court: identified by $\mathcal{C}$, refers to the official judges who can approve $\mathcal{L}$ 's request to conduct an investigation on a vehicle according to the specified legal standard.

Decryption Authorities: identified by $\mathcal{A} = \{\mathcal{A}_1, \ldots, \mathcal{A}_j, \ldots, \mathcal{A}_n\}$, refer to the entities who jointly maintain a master secret key by using the DKG protocol. They provide the shares to allow $\mathcal{L}$ to recover the decryption key if she/he has an authorized warrant. In particular, $\mathcal{L}$ needs to obtain at least t+1 shares to decrypt the data downloaded from the data storage. $\mathcal{A}$ can be the established organizations in real-world deployment, e.g., the government departments.

Blockchain Platform: identified by $\mathcal{B}$, recognized as a permissioned blockchain that is maintained by multiple blockchain nodes. There are several roles that can act as the blockchain nodes in BB-VDF, such as the court, the law enforcement agency, and the decryption authorities. Other parties are allowed to join in this ecosystem with the permission. Specially, the state of a warrant is recorded in $\mathcal{B}$, which enables the public to audit the validity and legitimacy of the investigation.

Distributed Data Storage: identified by $\mathcal{D}$, refers to the data storage system that stores the related forensics data. Our scheme adopts the distributed data storage techniques that can be utilized in the present design (e.g., S3). The data is encrypted in $\mathcal{D}$ that if $\mathcal{L}$ intends to retrieve data, she/he needs to be granted with the authorized access by $\mathcal{C}$ and $\mathcal{A}$ to obtain a decryption key.

It is assumed that a forensics daemon runs inside the OBU and will submit the data which are related with VDF to $\mathcal{B}$ and $\mathcal{D}$ periodically. More preciously, if there exists a suspicious behavior or an accident that needs to be investigated, first applies for a valid warrant from $\mathcal{C}$. If $\mathcal{C}$ permits, she/he will issue a warrant cryptographically signed by her/his secret key to allow $\mathcal{L}$ to acquire data. After that, L first requires a decryption key from $\mathcal{A}$ using the authorized warrant, and then collect data from $\mathcal{D}$. Each step during the investigation is required to submit a transaction to prompt the state machine transition in smart contracts, which will be described in subsection.

The underlying $\mathcal{B}$ is built atop of the existing permissioned blockchain, e.g., Ethereum. Transaction fee is not considered in the present scheme, which is the incentive problem. As widely known, the Ethereum blockchain can support Turing-complete smart contract (e.g., solidity) which is extremely useful for constructing the state machine and accomplishing auditable forensics investigations. To construct a secure blockchain platform, we design that some special blockchain nodes (e.g., the $\mathcal{C}$) have higher weight to maintain the security of $\mathcal{B}$ than other nodes. Proof-of-Stake (PoS) based blockchain platform can be used to support this design.

An embedded hardware-security-module (HSM) based scheme is adopted in the present scheme that any data request through vehicle's ECUs should be authorized, which ensures ECUs with secure communications for on-board system. When it is necessary to collect directly from the vehicle (e.g., traffic accidents), the forensics daemon within OBU communicates with different ECUs through CAN bus requires access authorization, which guarantees the security of data collection. In particular, the data is encrypted using hybrid encryption method before being sent to $\mathcal{D}$. The data is encrypted using symmetric encryption algorithm and the symmetric key is encrypted based on the customized KP-ABE scheme. In addition to the vehicles, the other data sources will generate some operations and maintenance data on a specific vehicle which are helpful for the forensics. These parties are required to upload the data to $\mathcal{D}$ periodically, and $\mathcal{L}$ cannot be allowed to require data directly from them. Particularly, their data encryption and decryption algorithms are in consistent with the vehicles, so other parties' forensics data retrieval will not be emphasized in the concrete scheme.

Threat Model

Without loss of generality, the security of $\mathcal{B}$ follows the majority-honest-assumption that if most of the blockchain nodes are honest, $\mathcal{B}$ will be run accurately and the smart contract will be accurately executed with valid inputs.

Moreover, it is assumed that the forensics daemon is run in a trusted hardware so that the malicious attackers cannot disturb the normal running, or tamper the content of the collected data. Each data submission will be signed with vehicle's secret key. Similar to the prior schemes on digital forensics, all parties involved in the present scheme are assumed with bounded computation, and most of them are honest and perform their duties properly. However, there still exist some malicious insiders or external attackers who may undermine the forensics investigation. It is that part of $\mathcal{A}$ may be compromised or dishonest, as long as no more than a pre-defined number (depending on the protocol design in real-world). $\mathcal{L}$, $\mathcal{C}$, and honest $\mathcal{A}$ will not collude with each other during the investigation. Specifically, we mainly focus on the following security threats:

Threat 1: Malicious Law Enforcement Agency $\mathcal{L}$ usually belongs to a trusted institution in reality. However, there exist malicious insiders who may be in pursuit of individual profit and do not follow the standardized digital forensics process. Thus, we consider that $\mathcal{L}$ may be untrustworthy in the threat model. In particular, a warrant issued by $\mathcal{C}$ designates the detailed investigation information (e.g., the data type that $\mathcal{L}$ can acquire), which specifies that $\mathcal{L}$ cannot acquire more than the designated data during the investigations. However, malicious $\mathcal{L}$ (denoted as $\mathcal{L}^*$) may attempt to: 1) acquire more data without explicit approval, 2) take advantage of an expired warrant to obtain access to unauthorized data, or 3) alter or forge the collected evidences before presenting to $\mathcal{C}$. Furthermore, potential external attackers may attempt to compromise $\mathcal{L}$ and impersonate an authorized $\mathcal{L}$ to access the data or conduct further attacks.

Threat 2: Honest-but-Curious Court $\mathcal{C}$ is a trusted institution who will comply with the designated protocols to make a judgement. $\mathcal{C}$ cannot learn about the details of data records besides the related forensics data. However, there may exist malicious insiders who are curious about the detailed data records. In addition, $\mathcal{C}$ may forget to track the states of issued warrants, which will allow $\mathcal{L}$ to acquire data even by using the expired warrants.

Threat 3: Untrustworthy Authorities

None of $\mathcal{A}$ can learn about the details of a warrant and data records, especially for the investigation of terrorist attacks. Generally, if given an authorized warrant, $\mathcal{A}$ will provide the correct secret shares honestly. However, partially compromised or internal malicious $\mathcal{A}$ (denoted as $\mathcal{A}^*$) may exist and may attempt to get the details of a warrant, e.g., the identity of the suspicious vehicle. Then, they may collude with a suspicious vehicle, which allows the vehicle to change her/his behavior. Besides, $\mathcal{A}^*$ may attempt to learn about the plaintext of the data records.

Security Goals

In order to enable accountability and fine-grained access control for VDF and resist the aforementioned security threats, the proposed scheme should achieve the following high-level security goals:

Accountability

Accountability in digital forensics can be considered as a secure assurance that the related parties (including $\mathcal{C}$, $\mathcal{L}$, and $\mathcal{A}$) will not misuse or abuse their powers during the investigation forensics. The proposed scheme will achieve accountability from the following aspects:

Complete Process Audit: To ensure the legitimacy of an investigation for digital forensics, the crucial process nodes should be identified and each process node needs to be audited by the public with the blockchain system. Specially, each process node transformation should have a digital signature and should follow the legal standards. Take the warrant authorization for an example, before $\mathcal{L}$ requires a decryption key from $\mathcal{A}$, she/he needs to apply for a digital warrant signed by $\mathcal{C}$, which is accomplished by submitting a transaction to $\mathcal{B}$. The blockchain nodes will check the validity of the request, and prompt the process to the next stage if the signature is valid.

Public Verifiability: The proposed scheme should be able to prevent unauthorized actions or behaviors during the process of investigation. Specially, each process node should be publicly scrutiny, which means the involved parties should be accountable for the investigation and prevented from abusing or misusing their granted power.

Privacy Preservation

The proposed scheme should preserve the secrecy of the warrant and forensics data as follows:

Confidentiality of Warrant: The detailed information of a warrant should be temporarily protected to prevent any unauthorized entity from learning about it for a period of time, especially in terms of VRA investigation. We design that $\mathcal{L}$ and $\mathcal{C}$ know the warrant details, while the unauthorized parties can only know the metadata of the warrant, e.g., the short description and its hash value.

Confidentiality of Forensics Data: The content of forensics data should be protected except the authorized $\mathcal{L}$, and if the forensics data is generated during the production, renting and maintenance process, then also the car manufacturers, rental companies and maintenance centers, respectively.

Data Security

The proposed scheme should be able to achieve the following data security goals:

Availability: The scheme should ensure the service and data availability that resist against DDoS attacks and Single point of failure/compromised (SPoF/C).

Integrity: To ensure the validity and legitimacy of the evidence, the scheme should be able to protect the integrity of the data (e.g., $\mathcal{V}$), which is also the requirement of digital chain of custody that the digital evidence presented in the $\mathcal{C}$ should be consistent with the original generated data without tampering or corrupting. Note that our scheme mainly focuses on data integrity protection after the data has been generated.

Unforgeability: The data records or the intermediate generated parameters that will be used in the forensics cannot be forged by any malicious users.

In one embodiment of the present disclosure, the vehicles (i.e., S) are used as illustration to denote how the forensics data are generated and collected. The proposed scheme can be extended to support other data sources with a little change. As mentioned before, a forensics daemon runs in OBU to collect the related data that might be helpful for forensics (e.g., the latest vehicle operations) based on different sensors. The forensics daemon submits these data to $\mathcal{D}$ periodically when there is a good network connection. Specially, the hash value of the forensics data is submitted to $\mathcal{B}$ periodically with a short interval, while the encrypted data records are stored off-chain.

Specifically, $\mathcal{L}$ generates a warrant information which contains the metadata and detailed data. The metadata can be published in $\mathcal{B}$ and the detailed data which specifies the forensics data range (i.e., the attributions) is kept secret from any unauthorized parties. After the warrant being authorized by $\mathcal{C}$, $\mathcal{L}$ can conduct the digital forensics on the specific object. We mainly focus on the processes of warrant authorization, collection and reporting (i.e., 1, 2, 5 as in FIG. 4). During the collection phase, $\mathcal{L}$ applies for a secret key from $\mathcal{A}$ and collects the forensics data on two aspects: 1) the vehicle itself and 2) data storage $\mathcal{D}$. To acquire real-time data from the vehicle, $\mathcal{L}$ can use the authorized secret key to generate a signature, the forensics daemon will verify the validation of the signature and send a diagnostic command to each ECU, and $\mathcal{L}$ will get the ciphertexts. On the other hand, to collect a vehicle's historical data from $\mathcal{D}$, $\mathcal{L}$ uses the secret key to find the download link, and downloads the corresponding data from $\mathcal{D}$. As for the data analysis phase, the present scheme follows the idea of block4forensics blockchain framework that integrates different kinds of data to conduct the analysis. Finally, the time-scheduling service in smart contract is designed for the reporting.

Figure 4:
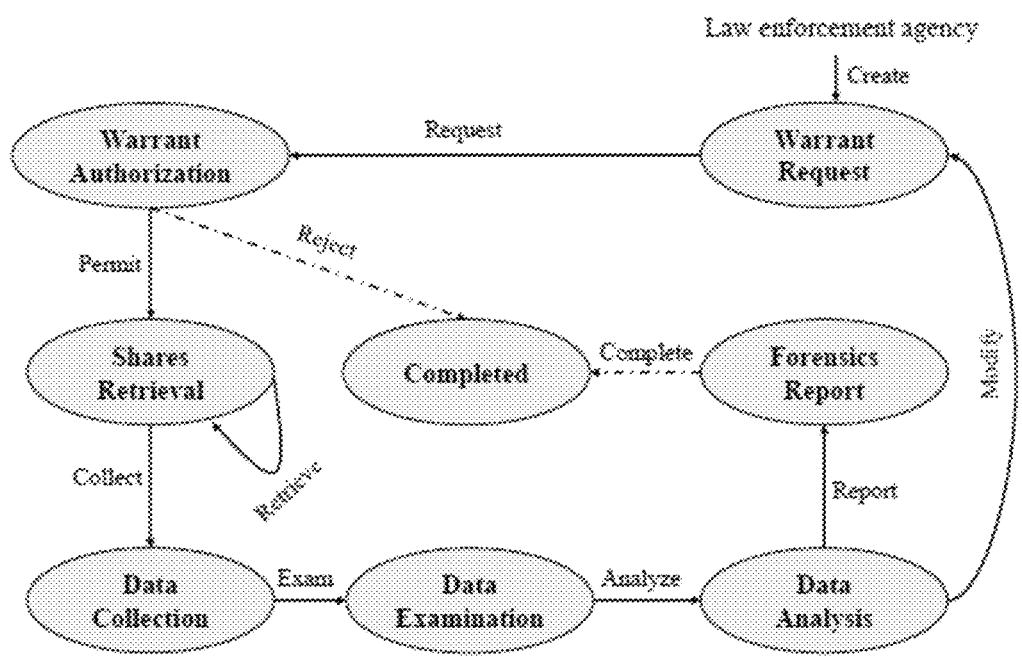
FIG. 4 shows a state machine model according to an embodiment of the present disclosure.

State Machine: An FSM is constructed to depict the vehicle forensics in smart contracts as illustrated in FIG. 4. According to the practical scenario, the process nodes are modelled as some states and are represented in smart contracts. The state machine essentially represents a life cycle for a warrant. Each state denotes a global process node of the warrant. In particular, we design more concrete states than the states in the general workflow as shown in FIG. 4. The states follow verification-then-forwarding model that any state transition should be combined with a digital signature in a transaction and verified by the multiple blockchain nodes.

FIG. 4 shows different states that a warrant can be in and how the FSM transits from one state to another. There are eight states in FSM: Warrant Request, Warrant Authorization, Shares Retrieval, Data Collection, Data Examination, Data Analysis, Forensics Report, and Completed. The initial state Warrant Request refers to $\mathcal{L}$ initializes to request a warrant. We define different "events" that trigger the state transition. If $\mathcal{C}$ allows the Warrant request the FSM transitions to the Warrant Authorization state, otherwise the state will be transited to Completed state by $\mathcal{C}$. The inputs for different states are derived from different parties. If $\mathcal{L}$ determines that more data needs to be collected when the state is in Data Analysis, she/he needs to send an order modification request to $\mathcal{C}$ and the state is transferred into the initial Warrant Request. More precisely, a state $\sigma_1$ that is transited into a new state $\sigma_2$ according to a transaction TX is denoted as $$\sigma_1 \xrightarrow{TX} \sigma_2.$$

Furthermore, a timer is designed to schedule some specific tasks in FSM based on the time-scheduling service. If one of state transitions fails, e.g., a specified condition cannot be satisfied by the off-chain parties for a pre-defined time interval, then the corresponding parties are to be informed or the forensics will be aborted. Considering the above-mentioned scenario, for example, $\mathcal{C}$ may forget to track the states of the warrants which are actually expired, while other parties may not realize the expiration and may still maintain cooperation, which is apparently not in alignment with the legal process. To address this issue, the present scheme ensures that each involved party has a clear understanding on the state of the warrant, and knows when do they cooperate for the investigation. Specifically, a service called Ethereum Alarm Clock (EAC) is adopted to provide the time-scheduling service. It allows to schedule transactions to be executed after a certain time. In doing so, some of the state transitions are accomplished by specifying the pre-prescribed actions which follow the standard investigation of VDF. For example, if a state transaction of warrant is not satisfied for a pre-defined time, the EAC service could automatically transit the state to Completed.

Further, a concrete scheme according to an exemplary embodiment of the present disclosure by leveraging the blockchain and cryptographic tools is discussed below.

System Initialization and Configuration

In BB-VDF, the court $\mathcal{C}$ is responsible for initializing the whole system in the system setup phase. More precisely, given the security parameters $\eta$, $\mathcal{C}$ generates the public parameters. Let $G_1$ be a bilinear group with prime order $p \in \theta(2^\eta)$. g is a random generator of $G_1$. Besides, let $H_0$, $H_1$, $H_2$ be three cryptographic hash functions: $H_0: \{0,1\}^* \to Z_p$, $H1: H_1: \{0,1\}^* \to G_1$, $H2: G_T \to \{0,1\}^k$, where k is the length of the symmetric encryption key, e.g., 128 bits.

To resist against SPoF/C and prevent single party from abusing the power, the present scheme, employs generating the phase of secure DKG protocol. By doing so, each authority $\mathcal{A}_j$ holds a secret share $\alpha_j$ and jointly maintains a master secret key $\alpha$ with other authorities. After that, a set $\mathcal{N}$ of t+1 authorities publish their partial public parameters $v_j = e(g,g)^{\alpha_j}$ and generate the system public parameters as:

$$\prod_{j \in \mathcal{N}} (e(g,g)^{\alpha_j})^{\lambda_j} = e(g,g)^{\prod_{j \in \mathcal{N}} \lambda_j \alpha_j} = e(g,g)^{\alpha}$$

Then, the trusted authority specifies the master public parameters PK as PK=(G, p,g,e(g,g)$^\alpha$, H$_0$,H$_1$,H$_2$). The master private key is MSK={$\alpha$} which is not controlled by any party. Besides, involved parties have their own key pairs (public key and private key). Their public keys are authenticated by $\mathcal{C}$ and published in the blockchain that anyone can verify the validity of a signature. The identity management and authentication are not depicted here.

Digital Forensics Data Generation

During the data generation phase, the parties, including vehicles, car manufacture, and maintenance centers, are required to periodically submit the related data to $\mathcal{D}$. The period can be flexibly set, such as one hour or half an hour for the consideration of real-time forensics. Assume that a forensics data submitted by $S_i$ is denoted as $d_{id,type,t}$, where id refers to the identity of $S_i$, type refers to the data type (e.g., steering wheel, brake, seat belt), and t refers to the timestamp. For simplifying the analysis, we assume that the vehicles collect data at an integer time stamp. These variables are essentially defined as attributes, such as tagging a data $d_{id,type,t}$ with the metadata ("id: Alice", "type: steering wheel", "t: 2019/07/22 22:00").

In terms of the vehicle forensics data generation, the forensics daemon in $\mathcal{S}_i$ interacts with the ECUs and collects data $\beta_{t_1} = \{d_{id,type_1,t_1}, \ldots, d_{id,type_m,t_1}\}$ at time $t_1$. These data are encrypted with hybrid encryption method and sent to the off-chain $\mathcal{D}$. Meanwhile, $\mathcal{S}_i$ submits a transaction to $\mathcal{B}$, which stores the metadata (e.g., hash value, timestamp) on-chain. In doing so, the data integrity can be verified with the tamper-resistant transaction records in the blockchain. It is worth noting that $\mathcal{S}_i$ does not need to submit a transaction for each $d_{id,type,t}$, she/he can construct a Merkle Hash tree based on the consecutive several data (e.g., $\beta_{t_1 \sim t_\zeta} = \{\beta_{t_1}, \ldots, \beta_{t_\zeta}\}$) and store the Merkle root value to the blockchain. During the data analysis phase, $\mathcal{L}$ can verify the integrity of a specific data using the Merkle tree proof verification algorithm. Specifically, the process of the digital forensics data generation can be described with the following steps:

To encrypt $d_{id,type,t_2}$ the forensics daemon randomly generates two number $s_1 \in Z_p$, $\varepsilon_1 \in G_T$ and computes the hash value $k_1 = H_2(\varepsilon_1)$. Then, $\mathcal{S}_i$ uses $k_1$ to encrypt the data $d_{id,type,t_2}$ with symmetric encryption algorithm (e.g., AES-128) and computes the values as follows:

$$k_1 = H_2(\varepsilon_1),$$

$$\hat{C} = g^{s_1},$$

$$M_{id,type,t} = Enc_{k_1}(d_{id,type,t_1}),$$

$$H_{M_{id,type,t_1}} = H_0(M_{id,type,t_1}),$$

$$C = \varepsilon_1 \cdot e(g,g)^{\alpha s_1}$$

$$\{C_x = H_1(x)^{s_1}\}_{x \in \{0,1\}^*},$$

$$\theta_1 = H_0(id\|type\|t_1)$$

where $\theta_1$ is defined as the corresponding download link of $d_{id,type,t_1}:\{\theta_1:(M_{id,type,t_1},C,\hat{C},\{C_x\}_{x \in \{0,1\}^*})\}$ are stored to $\mathcal{D}$. Given a download link, private information retrieval (PIR) technique can be adopted when retrieving the data from $\mathcal{D}$, which protects the privacy of the attributes without exposing others.

After collecting $\varsigma$ period data, the forensics daemon computes the Merkle root value root, $$root = MerkleRoot\left(H_{M_{id,type_1,t_1}}, \ldots, H_{M_{id,type_m,t_\varsigma}}\right)$$

by mapping the consecutive m×$\varsigma$ ciphertexts to a group element root.

Vehicle $V_i$ prepares and signs the transaction with the private key:

$$TX_{V_i}^1 = [root, (\theta_1, \ldots, \theta_{m \times \varsigma}), T_i]_{K_{V_i}^S}$$

where $T_i$ refers to the generation timestamp of the transaction.

Warrant Request and Authorization

In case of accidents or suspicious behaviors, $\mathcal{L}$ will send a request req to $\mathcal{C}$ to apply for a warrant before conducting to the substantive investigation. req refers to the detailed information of the request which includes the description of metadata and attribution data (i.e., target identity, data type, and time). The metadata is opened for public verification while the attributions are kept secret. The request req can contain multiple vehicles, different data types and timestamp, which can be achieved by constructing a comprehensive access policy $\mathbb{A}$. Let A=(W, $\rho$), W be an l×u matrix, and $\rho$ be the function that associates rows of W to the attributes. Particularly, the multiple decryption authorities can jointly generate a private decryption key for the access policy. For instance, our scheme allows $\mathcal{L}$ to decrypt the ciphertexts with attribution sets satisfying the access policy: ("id: David" OR "id: Carl") AND (2019/06/21 22:00≤"time"≤2019/06/23 22:00).

Specifically, L submits a transaction with des to the smart contract to create a new state machine life cycle. The initial state is set as Warrant Request as shown in FIG. 4. L privately sends the structure of access policy $\mathbb{A}$ to $\mathcal{C}$ through a secure channel. If the request is valid, $\mathcal{C}$ will sign on the request and generate some intermediate parameters which are used for recovering the decryption key. Otherwise, the investigation will be rejected and the state transits into Completed. The processes of warrant request and authorization can be depicted as follows:

L sends a warrant request req which contains the access policy $\mathbb{A}$ and metadata des to $\mathcal{C}$, and submits a transaction to create a new warrant state machine FSM in the smart contract. $H_{req}=H_0(req)$ is computed as the unique identifier of the warrant in $\mathcal{B}$. The public can audit the process of a legitimate forensic investigation based on the identifier.

$$TX_L^2 = [des, H_{req}, T_i]_{K_L^S}$$

An FSM instance is created in smart contract as:

$$* \xrightarrow{TX_L^2} \text{Warrant Request}$$

$\mathcal{C}$ receives the structure $\mathbb{A}$ and evaluates whether to approve the investigation request. If no, $\mathcal{C}$ submits a transaction to terminate the FSM instance (i.e., prompts the FSM to Completed). Otherwise, $\mathcal{C}$ selects $\lambda$ sets of random numbers $r_1, \ldots, r_\lambda \leftarrow Z_p$ and generates the following values:

$$\xi_1 = (H_1(\rho(1))^{r_1}, g^{r_1}, \forall\, d \in \Gamma/\rho(1), H_1(d)^{r_1})$$

$$\ldots$$

$$\xi_\lambda = (H_1(\rho(\lambda))^{r_\lambda}, g^{r_\lambda}, \forall\, d \in \Gamma/\rho(\lambda), H_1(d)^{r_\lambda})$$

$$res = (\xi_1, \xi_2, \ldots, \xi_\lambda)$$

where res is the response message that will be sent back to $\mathcal{L}$ through the secure channel.

$\mathcal{C}$ submits a transaction with a digital signature on the value of $(H_1(\rho(1))^{r_1}, \ldots, H_\lambda(\rho(\lambda))^{r_\lambda})$. In doing so, $\mathcal{A}$ or the public can confirm that the decryption key request from $\mathcal{L}$ is authorized by $\mathcal{C}$ without abusing power:

$$TX_\mathcal{C}^3 = [H_{req}, H_0(res), H_1(\rho(1))^{r_1}, \ldots, H_1(\rho(\lambda))^{r_\lambda}, T_i]_{K_\mathcal{C}^S}$$

If $\mathcal{C}$ permits the request and the blockchain has confirmed the validity of the transaction, the FSM instance will transit into the new state as:

$$\text{Warrant Request} \xrightarrow{TX_\mathcal{C}^3} \text{Warrant Authorization}$$

Auditable Data Collection $\mathbb{A}$

To securely retrieve a private decryption key that satisfies the access structure $\mathbb{A}$, $\mathcal{L}$ blinds the values res and sends them to different authorities and aims to collect enough shares to recover the decryption key. Each authority measures whether to provide the share to $\mathcal{L}$ based on the clues and judgement.

The master secret key is maintained by n decryption authorities without being recovered by any single authority. To recover the decryption key, $\mathcal{L}$ requires a set $\mathcal{N}$ of t+1 decryption key shares from $\mathcal{A}$. Each authority $A_j$ will blind it with some random numbers to protect the privacy and submit a transaction to the blockchain. In doing so, any authorities' behavior is recorded in transaction without repudiation for the auditability of forensics. Note that before providing the share to $\mathcal{L}$, $A_j$ will verify that whether the state of the state machine is Share Retrieval and req is a legitimate investigation.

To protect the privacy of investigation, we design that the attribution values $\rho(1), \ldots, \rho(\lambda)$ are not revealed to any party in the customized KP-ABE scheme. Let $\Gamma = \{d: \exists\, i \in [1,\lambda], \lambda(i) = d\}$. $\mathcal{L}$ chooses a set of random numbers $r_{\varepsilon_1,d} \in Z_p$, $\varepsilon_1 \in [1,\lambda]$ and computes the blinded values on res as follows:

$$\varphi_1 = (H_1(\rho(1))^{r_1}, g^{r_1 r_{1,1}}, \forall\, d \in \Gamma/\rho(1), H_1(d)^{r_1 r_{1,d}}),$$

$$\ldots$$

$$\varphi_\lambda = (H_1(\rho(\lambda))^{r_\lambda}, g^{r_\lambda r_{\lambda,1}}, \forall\, d \in \Gamma/\rho(\lambda), H_1(d)^{r_\lambda r_{\lambda,d}}),$$

Then, $\mathcal{L}$ sends $\{\varphi_1, \ldots, \varphi_\lambda\}$ to each authority. Note that the values $\{g^{r_x}, \forall\, d \in \Gamma/\rho(x), H_0(\rho(d))^{r_x}\}, x \in [1,\lambda]$ have been blinded with random $r_{\varepsilon_1,d}$. In doing so, $A_j$ cannot launch testing attacks to learn about the values of the attributes.

Meanwhile, $\mathcal{L}$ sends a transaction to the blockchain to apply for the decryption key in $\mathbb{B}$.

$$TX_\mathcal{L}^4 = [H_{req}, H_1(\rho(1))^{r_1}, \ldots, H_1(\rho(\lambda))^{r_\lambda}, H_0, H(\varphi_1), \ldots, H_0(\varphi_\lambda), T_i]_{K_\mathcal{L}^S}$$

The state machine is transited as $$\text{Warrant Authorization} \xrightarrow{TX_\mathcal{L}^4} \text{Shares Retrieval.}$$

After that, each authority will verify whether the private decryption key request is corresponding to the authorized request by $\mathcal{C}$, which can be easily checked by the published transactions $TX_\mathcal{C}^3$ and $TX_\mathcal{L}^5$. If $A_j$ confirms the request is legitimate, she/he will join the data collection phase to recover the forensics data. As for $A_j$, she/he uses the secret share $\alpha_j$ which is a share of the master secret key MSK $\{\alpha\}$ to compute $SK_j$, a share of the decryption key SK (note that $\alpha = P_{j \in N} \in \lambda_j \alpha_j$). Since $\alpha$ is not reconstructed explicitly by any single authority, $\mathcal{A}_j$ cannot compute $\{g^{\mu_s}, \ldots, g^{\mu_j}\}$ directly, but she/he can use the share $\alpha_j$ to compute the intermediate parameters, i.e., $\{g^{\mu_{1,j}}, \ldots, g^{\mu_\lambda}\}$, where $\{g^{\mu_{a,j}} = g^{W_a(\alpha_j, y_2, \ldots, y_n)}\}$, $a \in [1,\lambda]$. Specially, to prevent $\mathcal{L}$ or the public from knowing the value of $g^{\mu_{a,j}}$, $A_j$ chooses a random number $r_j' \in Z_p$ and computes the secret share $\tilde{SK}_j = (\tilde{\varphi}_{1,j}, \ldots, \tilde{\varphi}_{\lambda,j})$ as follows:

$$\left(g^{\mu_{1,j}} H_1(\rho(1))^{r_1 r_j'}, g^{r_1 r_{1,1} r_j'}, \forall\, d \in \Gamma/\rho(1), H_1(d)^{r_1 r_{1,d} r_j'}\right),$$

$$\ldots$$

$$\left(g^{\mu_{\lambda,j}} H_1(\rho(\lambda))^{r_\lambda r_j'}, g^{r_\lambda r_{\lambda,1} r_j'}, \forall\, d \in \Gamma/\rho(\lambda), H_1(d)^{r_\lambda r_{\lambda,d} r_j'}\right),$$

$A_j$ sends $\tilde{SK}_j$ to $\mathcal{L}$. In particular, to allow the public to verify that the provided shares are indeed computed according to the authorized warrant, we can let the authority to approve that $(\tilde{\varphi}_{1,j}, \ldots \tilde{\varphi}_{\lambda,j})$ are indeed computed based on the authorized parameters $res = (\xi_1, \ldots, \xi_\lambda)$ using zero knowledge proof technique. In addition, each authority is required to submit a transaction to prove the validity of share-providing. By taking $A_j$ as an instance, the transaction is shown as follows:

$$TX_{A_j}^5 = \left[H_{req}, g^{\mu_{1,j}} H_1(\rho(1))^{r_1 r_j'}, \ldots, g^{\mu_{\lambda,j}} H_1(\rho(\lambda))^{r_\lambda r_j'}, T_i\right]_{K_{A_j}^S}$$

Note that $\mathcal{L}$ can recover the decryption key SK if she/he collects any set N of t+1 correct shares $\{\tilde{SK}\}_{\tau \in N}$. Specifically, $\mathcal{L}$ uses $r_{\varepsilon_1,d}$ to recover the final secret shares by multiplying exponentially with $1/r_{\varepsilon_1,d}$. For example, to recover $SK_1$, $\mathcal{L}$ respectively multiplies exponentially with $1/r_{1,1}, \ldots, 1/r_{1,\lambda}$ on $(g^{r_1 r_{1,1} r_1'}, \forall\, d \in \Gamma/\rho(1), H_1(\rho(d))^{r_1 r_{1,1} r_1'})$ and gets $(g^{r_1 r_1'}, \forall\, d \in \Gamma/\rho(1), H_1(\rho(d))^{r_1 r_1'})$. $A_j$ does not need to reveal the secret share $\alpha_j$, while $\mathcal{L}$ can still figure out the blinded shares without learning about any private information. $\mathcal{L}$ restructures SK according to secure DKG protocol as follows:

$$\{PK, (g^{\mu_1} \cdot H_1(\rho(1))^{r_1 \Sigma_{\tau \in N} r_\tau' \lambda_\tau}, g^{r_1 \Sigma_{\tau \in N} r_\tau' \lambda_\tau}, \forall\, d \in \Gamma/\rho(1),$$

$$H_1(d)^{r_1 \Sigma_{\tau \in N} r_\tau' \lambda_\tau}), \ldots, (g^{\mu_\lambda} \cdot H_1(\rho(\lambda))^{r_\lambda \Sigma_{\tau \in N} r_\tau' \lambda_\tau},$$

$$g^{r_\lambda \Sigma_{\tau \in N} r_\tau' \lambda_\tau}, \forall\, d \in \Gamma/\rho(\lambda), H_1(\rho(d)^{r_\lambda \Sigma_{\tau \in N} r_\tau' \lambda_\tau})\}$$

Provided that more than t authorities have provided the shares, the FSM instance is automatically transited into the new state as: Shares Retrieval $$\xrightarrow{\{TX_{A_T}^5\}_{\tau \in N}}$$

Data Collection n.

After restructuring the secret key SK, $\mathcal{L}$ retrieves the related data from $\mathcal{D}$ according to the attributes. Note that, based on the PIR protocol, the process of data retrieval does not expose the information whose data have been downloaded. Then, $\mathcal{L}$ computes the data decryption key and obtains the decrypted forensics data. In the meanwhile, $\mathcal{L}$ submits a transaction to prompt FSM into new state as: Data Collection $$\xrightarrow{TX_{A_T}^6}$$

Data Examination.

$$TX_{\mathcal{L}}^{\beta} = [H_{req}, H_0(H_{D_{id,type,t}}), {}^{T \times \}K_{\mathcal{L}}^s}$$

Data Examination and Analysis

In this phase, $\mathcal{L}$ will comprehensively conduct systematic search of the collected data to identify the potential evidences. Specifically, $\mathcal{L}$ needs to prove that the evidences belong to the legitimate collected data. Namely, the integrity of the evidences should be preserved. During the data examination, several kinds of software and hardware methods can be utilized. Furthermore, data reduction can be performed to reduce the size of the outcome. After the data examination, the state machine is transited to Data Analysis state by $\mathcal{L}$ (denoted as $TX_L^7$).

Data analysis is different from data examination as it further analyzes the evidences collected in data examination phase. A number of techniques and tools can be used. The details of the various methods that can be used to analyze the evidences are not discussed here in detail as they are commonly known in the state of the art. It is important to note that if $\mathcal{L}$ requires more data to be collected to accomplish the investigation, she/he needs to modify the court order and reapply for a request req*, which will follow the typical flow to collect data. Otherwise, the state machine will be transited into Forensics Report (denoted as $TX_L^8$).

Automated Vehicle Forensics Reporting

Based on the time-scheduling service in the designed contract, our scheme enables $\mathcal{L}$ to define notification on the final vehicle forensics report, so that the results and public information on this investigation is automatically sent to the different parties. For instance, if an accident happened and dispute existed, the final reports are required to send to drivers, insurance company, which can help them to make a judgement on the indemnity. The digest information of the report is recorded in the blockchain in case for need in the following investigation (denoted as $TX_L^9$). If $\mathcal{C}$ and $\mathcal{L}$ jointly confirm the final report, the state machine will be transited into Complete state (denoted as $TX_C^{10}, TX_L^{10}$).

According to the description of the above phases, we present the whole state machine transition for the vehicle digital forensics as the BB-VDF contract as shown in FIG. 5. In particular, when $\mathcal{L}$ accomplishes an investigation, the BB-VDF contract needs to receive multiple signatures from $\mathcal{L}$ and $\mathcal{C}$ in the "Complete" phase to terminate the FSM instance.

We claim:

1. A computer-implemented method of digital forensics, using at least one hardware processor, based on blockchain technology and a fine-grained access control scheme, the method comprising following steps:

using a finite state machine (FSM) based on smart contracts to manage a digital certificate for a full cycle, wherein, the full cycle includes eight states including a warrant request state, a warrant authorization state, a shared key acquisition state, a data collection state, a data examination state, a data analysis state, a forensic report state and a completion state;

entering the warrant request state and initializing a request for a warrant by a law enforcement agency and sending the request to a court and entering the warrant authorization state without leaking any sensitive information;

after receiving the request for the warrant, the court inspects the request for the warrant in the smart contract;

if the court rejects the request for the warrant, entering the FSM into the completion state, otherwise sending a permit allowing the request for the warrant by the court to the law enforcement agency along with a digital signature of the court;

after receiving the permit from the court, the law enforcement agency enters the shared key acquisition state, and obtains a fragmentation key from an alliance agency to form a master key, wherein, the fragmentation key is a partial part of the master key shared between a plurality of stakeholders of the digital forensics;

after receiving the secret share from the alliance agency, the law enforcement agency forms the master key to collect data for digital forensics, the status of state machine enters the data collection state;

after collecting the data, the law enforcement agency examines the data by using existing tools and the status of state machine enters the data examination state;

after examining the data, the law enforcement agency begins to analyse the data and the status of state machine enters the data analysis state;

after analyzing the data, the law enforcement agency forms a forensics report based on the examination and analysis of the data, and sends the report to the court; and the status of state machine enters the forensic report state; and after forming the forensics report by the hardware processor, entering the completion state;

wherein, each state transfer in the state machine requires at least one digital signature of at least one specific member for transitioning to a next state; and in the certificate request state, creating a digital forensics transaction in the smart contract by the law enforcement agency, transmitting sensitive information of forensics attributes including forensics object, data type, and time to the court over a secure channel and obtaining a first evidence;

in the warrant authorization state, after receiving the forensics attributes, generating intermediate parameters for decryption key based on the designed D-KP-ABE (Distributed Key Police Attribute-based Encryption) and signing the intermediate parameters by the court, and publishing the intermediate parameters in the blockchain; obtaining a second evidence;

in the shared key acquisition state, obtaining the fragmentation key from alliance authorities through authorized information, wherein, the alliance authorities jointly manage the master key, and use the fragmentation key to process and obtain the intermediate parameters issued by the court; and in the data collection state, after receiving the fragmentation key from the stakeholders, the law enforcement agency combines the fragmentation key to generate a decryption key for a corresponding attribute, and collects the data in a storage system.

2. The method of claim 1, wherein, the request for the warrant includes access policy information and metadata.

3. The method of claim 1, wherein, the request for the warrant includes access policy information and metadata.

4. The method of claim 1, wherein, the warrant has a unique identifier in the blockchain.

5. The method of claim 1, wherein, the warrant has a unique identifier in the blockchain.

* * * * *